United States Patent [19]

Ritz et al.

[11] Patent Number: 5,015,828
[45] Date of Patent: May 14, 1991

[54] SYSTEM AND METHOD FOR STRESS-RELIEF OF WELDS IN HEAT EXCHANGER TUBES

[75] Inventors: William C. Ritz, Greensburg; Robert D. Burack, Pleasant Hills, both of Pa.

[73] Assignee: Westinghouse Electric Corp., Pittsburgh, Pa.

[21] Appl. No.: 376,438

[22] Filed: Jul. 7, 1989

[51] Int. Cl.$^5$ .............................................. H05B 3/00
[52] U.S. Cl. .................................... 219/523; 148/127
[58] Field of Search ............... 219/523, 535, 541, 546, 219/403, 315; 148/127

[56] References Cited

U.S. PATENT DOCUMENTS

| | | |
|---|---|---|
| 4,196,049 | 4/1980 | Burns et al. . |
| 4,372,161 | 2/1983 | de Buda et al. . |
| 4,523,177 | 6/1985 | Driggers . |
| 4,672,741 | 6/1987 | Zafred et al. . |
| 4,700,040 | 10/1987 | Driggers . |
| 4,700,053 | 10/1987 | Driggers et al. . |
| 4,736,092 | 4/1988 | Piri et al. . |
| 4,771,526 | 9/1988 | Arzenti et al. . |
| 4,816,089 | 3/1989 | Cheng et al. . |
| 4,820,359 | 4/1989 | Bevilacqua et al. . |

FOREIGN PATENT DOCUMENTS 288153 12/1986 Japan .
1317124 6/1987 U.S.S.R. .

OTHER PUBLICATIONS

*Nuclear Engineering International* Entitled "Mobile Robots Gain Momentum" by Harvey B. Meieran and Floyd E. Gelhaus.

*Primary Examiner*—Roy N. Envall, Jr.

[57] ABSTRACT

Both a system and method for simultaneously heat treating a plurality of heat exchanger tubes in the tubesheet of a steam generator are disclosed herein. The system generally comprises a plurality of heater probes receivable within the open ends of the tubes, each of which has a bladder means for detachably securing the probe within the tube, a plurality of hose-like probe guide assemblies positionable over the open ends of the tubes for guiding the heater probes into the tubes, and an end effector having a cup-shaped coupler connected to a robotic arm for delivering the probe guide assemblies over the open ends of different tubes. The ability of each of the heater probes to detachably mount itself into proper position within its respective heat exchanger tubes advantageously frees up the robotic arm so that it can quickly and sequentially install a number of probe guide assemblies and heater probes in different locations within the tubesheet. Because the probe guide assembly installation time is a relatively small part of the entire heat-treating operation of a single tube, the system and method of the invention allows a plurality of non-adjacent tubes to be substantially simultaneously heat treated, thereby advantageously shortening the total amount of time necessary to perform the heat-treatment maintenance operation.

30 Claims, 3 Drawing Sheets

SYSTEM AND METHOD FOR STRESS-RELIEF OF WELDS IN HEAT EXCHANGER TUBES

BACKGROUND OF THE INVENTION

This invention generally relates to the heat treatment of metallic conduits, and is specifically concerned with the simultaneous heat treatment of a number of non-adjacent heat exchanger tubes in a steam generator.

Systems and methods for heat treating the heat exchanger tubes in nuclear steam generators are known in the prior art. For example, U.S. Pat. No. 4,820,359 assigned to the Westinghouse Electric Corporation discloses and claims a method for the heat treatment of the U-bends in such heat exchanger tubes. Still another example of known heat treatment systems and methods is disclosed in U.S. Pat. No. 4,816,089 which is also assigned to the Westinghouse Electric Corporation. In this last patent (the entire disclosure of which is incorporated herein by reference), a heater probe is oscillated within the section of a heat exchanger tube that is circumscribed by a support plate in order to relieve stresses generated by the accumulation of sludge and other debris in the annular space between the tube and the bore in the support plate through which the tube extends. Devices for heat treating a number of heat exchanger tubes simultaneously are also known in the art. Such a device is disclosed and claimed in U.S. patent application Ser. No. 213,923 filed June 30, 1988 by Paolo R. Zafred and also assigned to the Westinghouse Electric Corporation. This device is capable of implementing the stress relief process disclosed and claimed in the aforementioned U.S. Pat. No. 4,816,089.

While such prior art devices and methods work very well for their intended applications, recent refinements in the maintenance of heat exchanger tubes have created a need for a device capable of quickly and reliably heat treating a number of non-adjacent heat exchanger tubes simultaneously. Specifically, the Westinghouse Electric Corporation has recently pioneered new ways to reinforce damaged or cracked heat exchanger tubes by welding metal sleeves within these tubes, thereby creating a "hydraulic bridge" across the damaged sections thereof. While the installation of such sleeves by welding or braising techniques has been known for some time in the prior art, the new techniques developed by Westinghouse involve the use of a small, rotating mirror to direct a laser beam against the inner diameter of such a sleeve, thereby creating a weld between the outer diameter of the sleeve and the inner diameter of the heat exchanger tube which surrounds it. While such welding techniques have been found to create a high quality, water-tight weld joint between the ends of the sleeve and the sections of the heat exchanger tube to which they are welded, such welds also create tensile stresses in the tube due to the tendency of fused metal to draw-up upon re-solidification. If these tensile stresses are not relieved, they may promote stress corrosion cracking at this site, in the upper weld zone, thereby jeopardizing the integrity of the water-tight seal between the sleeve and the damaged section of the heat exchanger tube. While the aforementioned devices and stress relief methods can be successfully used to relieve stresses in the upper weld zones of such tubes, these prior art stress-relief techniques take up relatively large amounts of time. To understand why this is so, one must first understand some of the constraints that the working environment imposes on maintenance operations.

Because such stress-relief procedures take place within steam generators that have been operational for some time, the working environment is highly radioactive, and therefore the stress relief procedures must be remotely implemented by robotic arms such as the ROSA developed by the Westinghouse Electric Corporation. Moreover, because access to the open ends of the heat exchanger tubes can only be had through the relatively small and cramped confines of the channel head of the generator, there is, as a practical matter, room for only a single robotic arm. Since only one robotic arm is available to implement such heat treatment techniques, and since the arm must be used at all points in time to support the heater probe within the tube being heat treated, the tubes must be heat treated sequentially, with each heat treatment costing about nine minutes in time. While the device disclosed and claimed in co-pending U.S. patent application Ser. No. 213,923 might be used to simultaneously heat treat a pair of tubes, it can only do so if these tubes are adjacent to one another. Since this is often not the case, little if any savings in time can be realized by the use of such a previously known multiple probe manipulating device. As steam generator down-time can cost the electric generating utility over $500,000 a day in lost revenues, the long lengths of time necessary for the heat treatment of a number of non-adjacent tubes poses a formidable problem.

Clearly, what is needed is a system and method that is capable of simultaneously heat treating a number of non-adjacent heat exchanger tubes in a reliable and expeditious manner. Ideally, such a system should be compatible with known robotic devices, and should be simple to operate and manufacture.

SUMMARY OF THE INVENTION

Generally speaking, the invention is both a system and a method for simultaneously heat treating a plurality of metallic tubes, such as the heat exchanger tubes in a steam generator, that overcomes the deficiencies of the prior art. The system comprises a plurality of heater probes receivable within the open ends of the heat exchanger tubes, a plurality of probe guide assemblies positionable over the open ends of the tubes for guiding the probes into the tubes, each of which includes a guide conduit that terminates in a guide sleeve having an enlarged diameter portion and a narrow diameter portion, and an end effector connected to a robotic arm having a coupler for delivering the probe guide assemblies into position over the open ends of different tubes.

Each of the heater probes may includes a means for securing the probe within its respective tube. In the preferred embodiment, each of the heater probes includes an inflatable bladder which circumscribes its base portion. When the heater probe is extended so that the heat element at its upper end is adjacent to the region to the section of the tube to be heat treated, the bladder is inflated, thereby securing the heater probe into proper position within the tube throughout the entire heat treatment operation. At the termination of the heat treatment operation, the bladder is deflated, and the heater probe is removed so that it may be used to heat treat another heat exchanger tube. Each of the heater probes may further include a means for supporting its respective probe guide assembly after the probe has been detachably secured within its respective tube.

The ability of the heater probe to support itself within the tube frees up the robotic arm so that it may be used to deliver other probes guide assemblies and heater probes after the first heater probe has commenced its heat treatment operation.

The coupler of the end effector preferably includes a coupling member having an interior that is substantially complimentary in shape with the enlarged diameter guide sleeve located at the end of the probe guide assembly. In operation, the open side of the coupling member admits the narrow diameter portion of the guide sleeve, so that the walls of the coupling member may be used to capture and thereby couple with the enlarged diameter portion guide sleeve when the coupling member is raised. After this guide sleeve has been positioned beneath a selected heat exchanger tube and a heater probe has been secured therein, the support means of the heater probe serves to vertically support and to thereby suspend the probe guide assembly from the bottom of the tubesheet. Such suspension easily allows the system operator to de-couple the coupling member of the end effector from the guide sleeve by merely lowering the end effector out of capturing engagement with the enlarged diameter portion of the guide sleeve, and laterally withdrawing the end effector to allow the guide conduit to pass through the opening of the wall of the coupling member.

In the method of the invention, a first probe guide assembly is positioned in alignment over the open end of the first tube, and a first heater probe is detachably mounted within this tube. The end effector of the robotic arm is then de-coupled from the guide sleeve of this first guide tube assembly in the manner previously described, and the heater probe is actuated to commence heat treatment of the heat exchanger tube. At the same time, the coupling member of the end effector is used to position a second probe guide assembly over a second tube. After this step has been completed, a second heater probe is installed in the second heat exchanger tube and actuated so that the heat treatment of the operations of the first and second tubes occur substantially simultaneously. In the preferred embodiment, a third probe guide assembly and heater probe is used in parallel with the first and second probe guide assemblies and heater probes to further expedite the heat treatment process.

The system and method are capable of heat treating the welds in a large number of non-adjacent heat exchanger tubes in a highly reliable and time-saving fashion.

BRIEF DESCRIPTION OF THE SEVERAL FIGURES

DETAILED DESCRIPTION OF THE PREFERRED EMBODIMENT

Figure 1:
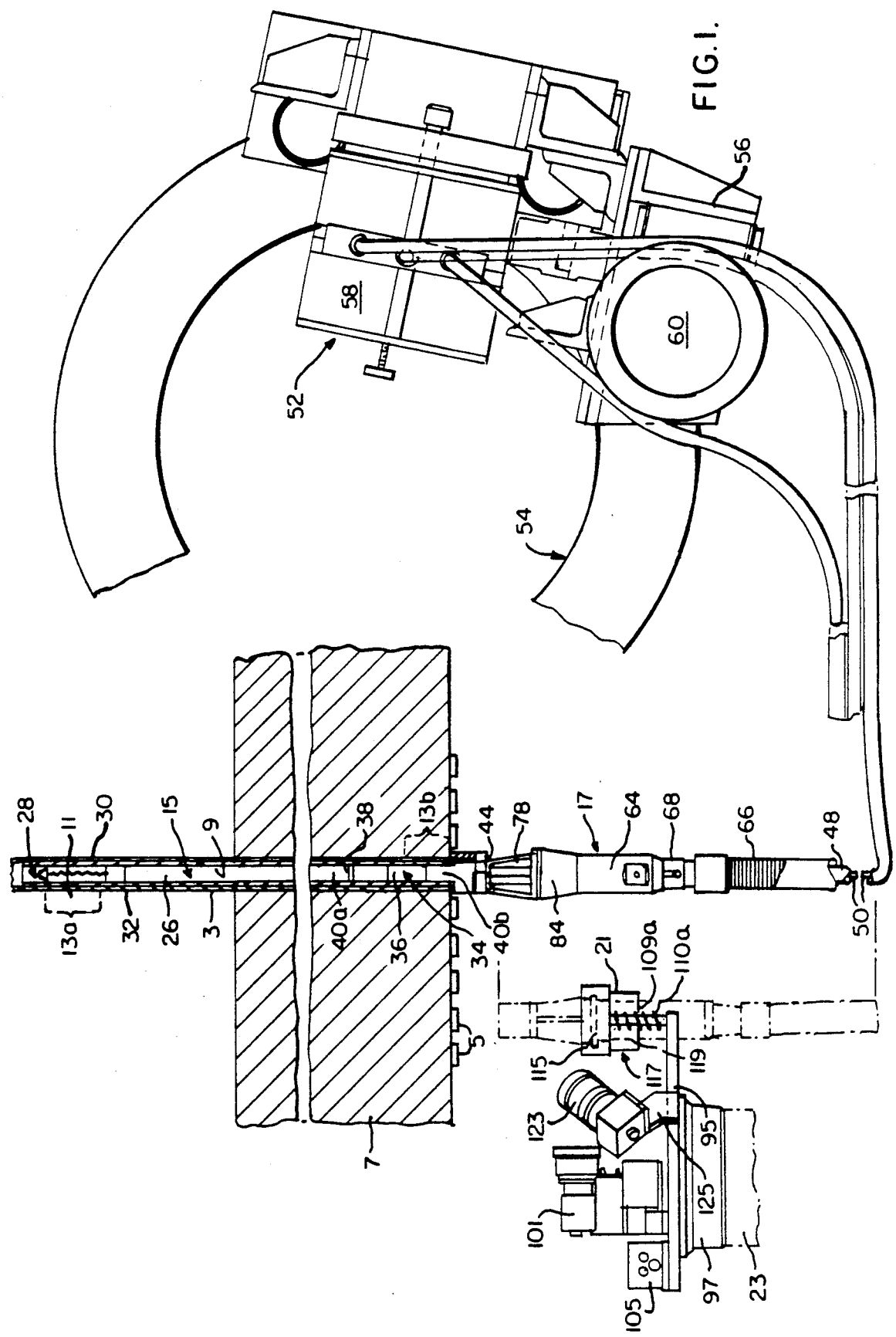
FIG. 1 illustrates one of the heater probes, the probe guide assemblies, and the end effector of the system of the invention as they appear in operation.

With reference now to FIG. 1, wherein like references designate like components throughout all the several figures, the heat treating system 1 of the invention is particularly adapted to relieve tensile stresses in the heat exchanger tubes 3 of a nuclear steam generator that have been repaired by a welding operation. Such heat exchanger tubes 3 includes an open end 5 that is mounted in a tubesheet 7 which separates the primary and secondary sides (not shown) of the steam generator. The heat exchanger tubes 3 are disposed in bores present in the tubesheet 7 of such generators. Over a period of time, sludge and other debris can accumulate in the small annular clearance between the bores in the tubesheet 7 and the outer surfaces of these heat exchanger tubes 3. Despite the fact that the tubes 3 are usually fabricated from a high-nickel stainless steel such an Inconel ®, such sludge can cause corrosion on the outer surface of such tubes 3 which in turn can ultimately lead to stress corrosion cracking. If the heat exchanger tubes 3 are allowed to crack as a result of such corrosion, radioactive water from the primary side of the steam generator will come into contact with the non-radioactive water used to generate the steam which ultimately turns the turbine blades of the electrical generator of the utility, thereby radioactively contaminating this area.

To prevent radioactive water from the primary side of the generator from contaminating the non-radioactive water in the secondary side, a variety of maintenance operations have been developed, one of the most common being installation of a sleeve 9 along the inner surface of the corroded section of the heat exchanger tube 3. Such sleeves 9 are dimensioned so that their outer diameters are very nearly the same as the inner diameter of the tube 3 being repaired. To repair the tube 3, the sleeve 9 is slid up through the open end 5 of the tube into the position illustrated in FIG. 1, and welded on its upper and lower end in order to secure the sleeve 9 within the tube 3 in a fluid tight manner. Such welding may be accomplished by either the laser welding system developed by the Westinghouse Electric Corporation, or by means of a compact TIG torch.

While the welding of such sleeves 9 to the inner surfaces of such heat exchanger tubes 3 effectively repairs the tubes 3 by providing a hydraulic "bridge" across a corroded section thereof, such welds unfortunately also create stress zones 13a,b at the upper and lower ends of the sleeve 9 as shown. Experience has shown that if the stresses in the upper zone 13a are not relieved, they are capable of promoting the occurrence of stress corrosion cracking in this area, since the upper weld defines the pressure boundary between the primary and secondary sides of the generator. Such corrosion induced cracking would, of course, seriously undermine the very purpose of the sleeve-welding operation. The principle purpose of the stress relief system 1 of the invention is to stress relieve the weld-induced tensile stresses present in the upper weld zone 13a. To this end, the system 1 generally comprises three heater probes 15 for applying stress-relieving heat to the zone 13a, three probe guide assemblies 17 for guiding the probes 15 to the open end 5 of a selected tube 3 to be treated, and a single robotic end effector 19 having a coupler 21 capable of coupling to and uncoupling from each of the probe guide assemblies 17. For simplicity, only one of the probes 15 and probe guide assemblies 17 is shown in the drawings. The end effector 19 is manipulated to vicinity of a desired heat exchanger tube 3 by means of a robotic arm 23 which is preferably the ROSA (remotely operated service arm) developed and patented by the Westinghouse Electric Corporation.

Figure 3B:
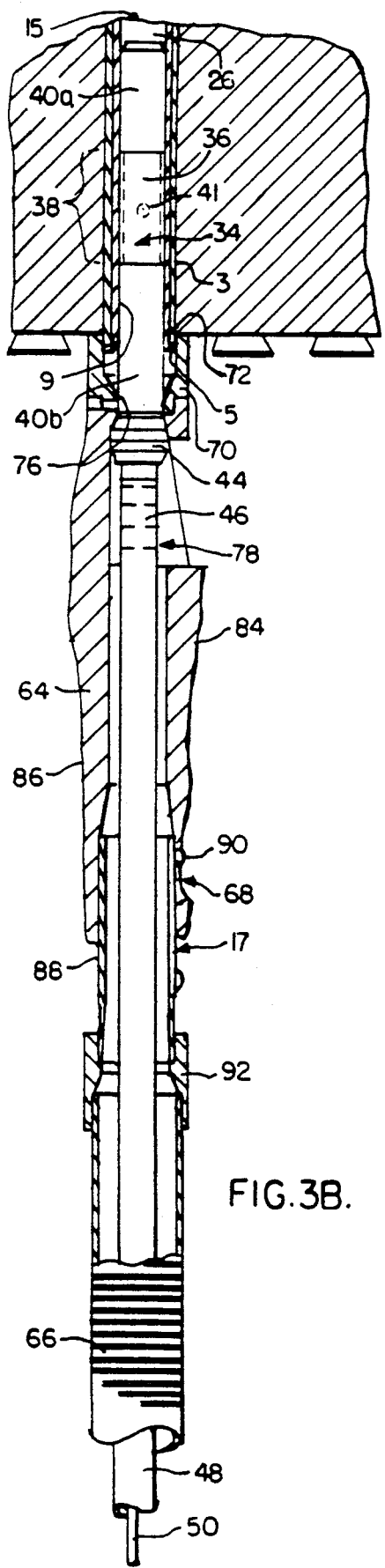
FIG. 3B is a cross-sectional side view of the probe guide assembly of FIG. 3A as it appears in operation, illustrating the lower portion of a heater probe that has been guided into a heat exchanger tube by the guide assembly.

With reference now to FIGS. 1 and 3B, each of the heater probes 15 includes a flexible body portion 26 which may be formed from a flexible plastic material, such as nylon. At its distal end, each heater probe 15 includes a radiant heater assembly 28 formed from a radiant heat source such as a tungsten-halogen projection bulb which may be a Sylvania Model 1,000-Q/3CL bulb, and a ceramic connector 32 having a screw socket (not shown) for receiving the screw-type base of the bulb 30. In the preferred embodiment, the ceramic connector 32 is concentrically aligned with the cylindrical body portion 26 so that the bulb 30 is uniformly spaced around the inner diameter of the sleeve 9 when the heater probe 15 is inserted into the open end 5 of a tube 3. Additionally, the ceramic material which forms the connector 32 insulates the flexible plastic that forms the body portion 26 from the heat radiated by the bulb 30.

As may best be seen with respect to FIG. 3B, the proximal end of each of the heater probes 15 includes a mounting mechanism 34 for detachably mounting its associated probe 15 within a selected tube 3 so that the end effector 19 of the system 1 may be freed up to manipulate another probe guide assembly 17 into place over another tube 3 in the tubesheet 7. This mounting mechanism 34 includes an expandable bladder 36 made from a durable, resilient plastic material such as urethane. This expandable bladder 36 is sleeve-like in shape and circumscribes a reduced diameter portion 38 provided at the lower end of the body portion 26 of the probe. Mounting sleeves 40a,b sealingly mount the upper and lower ends of the expandable bladder 36 over the reduced diameter portion 38. A bore 41 in the reduced diameter portion 38 which is ultimately connected to a source of fluidized pressure (not shown) provides pressurized fluid to the inner surface of the expandable bladder 36, thereby selectively expanding it into engagement with the inner surface of a sleeve 9 which has been welded into a tube 3. As will be discussed presently, the engagement between the outer surface of the expandable bladder 36 and the inner surface of the sleeve 7 is sufficient to bear not only the weight of the probe 15, but also the weight of a probe guide assembly 17 suspended from the bottom of the probe 15.

The extreme distal end of the probe 15 includes a mounting collar 44 whose purpose is to form a interference fit with the guide bushing 70 of the probe guide assembly 17 such that the assembly 17 may be suspended by the probe 15 when the mounting mechanism 34 is actuated and the end effector 19 of the system 1 is removed therefrom. Just below the mounting collar 44 is a nipple fitting 46 which connects a flexible drive cable 48 to the probe 15. As will be discussed in more detail presently, the flexible drive cable 48 serves to mechanically extend and withdraw its respective heater probe 15 through both the probe guide assembly 17 and the open end 5 of the heat exchanger tube 3 being heat treated. An air and wire conduit 50 is provided along the longitudinal axis of the flexible drive cable 48 for selectively providing compressed air to the bore 41 which serves to expand the bladder 36, and for providing electrical power to the projection bulb 30 used in the radiant heater assembly 28. Referring again now to FIG. 1, the flexible drive cable 48 of each of the heater probes 15 is ultimately connected to a pusher assembly 52 mounted in the manway 54 of the channel head of the steam generator by means of a bracket 56. The pusher assembly 52 includes a pusher mechanism 58 which extends or withdraws the flexible drive cable 48 by means of a reel (not shown). A guide spool 60 prevents the flexible drive cable 48 associated with each of the three heater probes 15 from becoming tangled. The mechanics of the pusher assembly 52 are similar to the probe pusher disclosed and claimed in U.S. patent application Ser. No. 375,989 filed July 6, 1989, by Robert D. Burack et al. and entitled "Multiple-Unit Probe Pusher and System for Driving Eddy Current Inspection Probes in the Heat Exchanger Tubes of a Nuclear Steam Generator" and assigned to the Westinghouse Electric Corporation, the entire specification of which is incorporated herein by reference. The length of the body portion 26 of the heater probe 15 is dimensioned so that the radiant heat assembly 28 thereof will be positioned adjacent to the upper weld zone 13a when the probe is in the fully inserted position illustrated in FIG. 1.

Figure 3A:
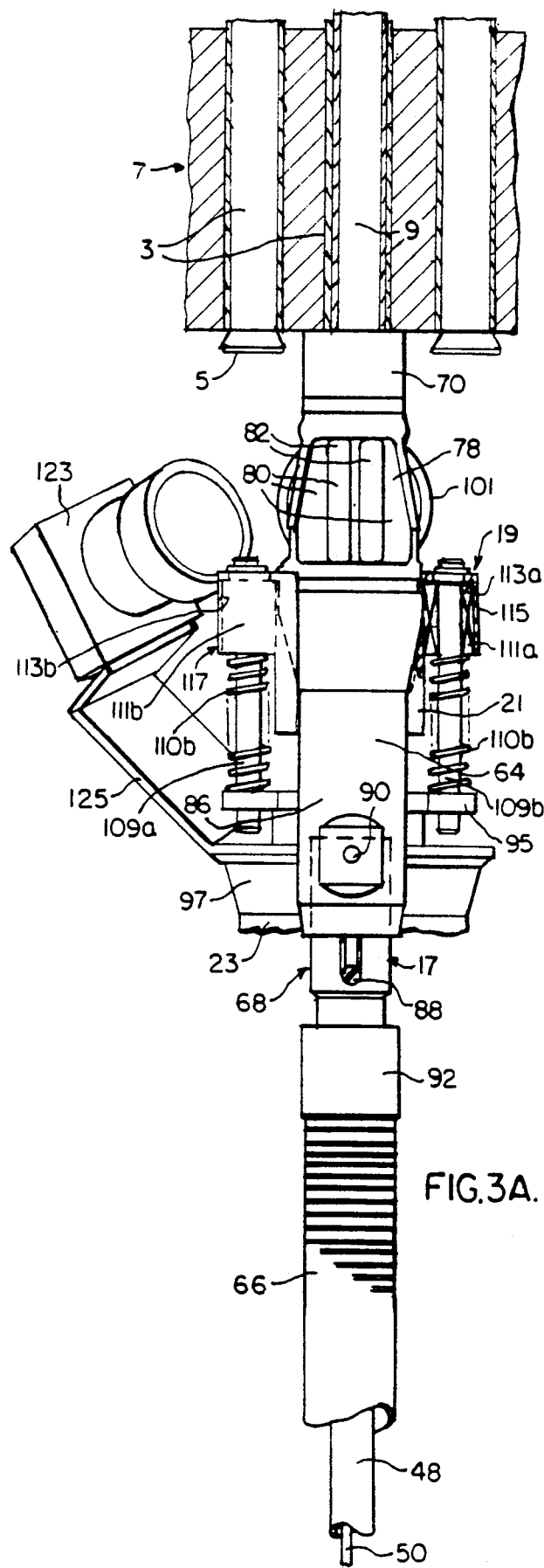
FIG. 3A is a side view of one of the probe guide assemblies of the system of the invention.

With reference now to FIGS. 1, 3A and 3B, each the three probe guide assemblies 17 is provided with a guide sleeve 64 at its distal end that is connected to a guide conduit 66 by means of a quick disconnect coupling 68. At its distal end, the guide sleeve 64 includes the previously mentioned guide bushing 70. This guide bushing 70 has an open end whose inner diameter is significantly larger than the outer diameter of the open end 5 of a heat exchanger tube so that it may not only receive the entire tube end 5 in the manner illustrated in FIG. 3B, but also afford some degree of lateral compliance between the bushing 70 and tube end 5. At is opposite end, the bushing 70 is provided with an annular shoulder 74 whose inner diameter is smaller than the outer diameter of the mounting collar 44 so that the bushing 70 will not conduct the mounting collar 44 and in fact will form an interference-type fit with the collar 44 which allows the probe 15 to suspend the entire probe guide assembly 17 when the end effector 19 is de-coupled from the guide sleeve 64. The guide bushing 70 terminates in a threaded end 76 which is received within a threaded recess located near the upper end of the guide sleeve 64.

Near its distal end, the guide sleeve 64 includes a window portion 78 formed from six support webs 80 which define slot-shaped windows 82. The purpose of these windows 82 is to allow the system operator to visually monitor the progress of the heater probe 15 through the probe guide assembly 17 when the probe guide assembly 17 is being held in the position illustrated in FIG. 3A by the end effector 19 of the system 1. Immediately below the window portion 78 of the guide sleeve 64 is a frustoconical coupling section 84 which has a relatively larger diameter than the neck portion 86 of the sleeve 64. As will be discussed presently, the frustoconical shape of the coupling section 84 is complementary in shape to the interior of the coupler 21 of the end effector 19 so that the coupler 21 may receivably capture it. Immediately below the coupling section 84 is the neck portion 86 whose outer diameter is narrower than the coupling section 84 and about the same as the outer diameter of the guide conduit 66. This neck portion 86 is detachably connected to the guide conduit 66 by means of the previously mentioned quick disconnect coupling 68 which is in turn formed from a connecting sleeve 88, a detent catch 90 and a fitting 92 in a conventional manner.

Figure 2A:
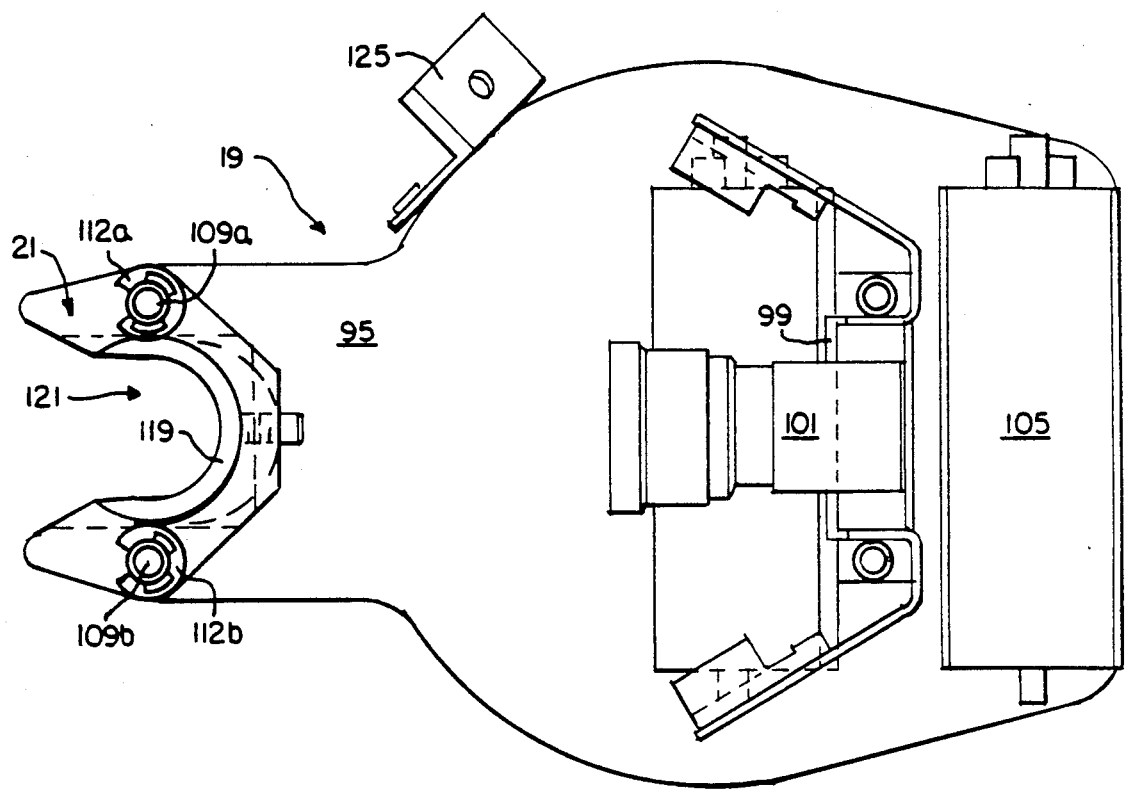
FIG. 2A is a plan view of the end effector of the invention, illustrating in greater detail the coupler of the end effector that is used to capture and deliver one of the probe guide assemblies of the invention.
Figure 2B:
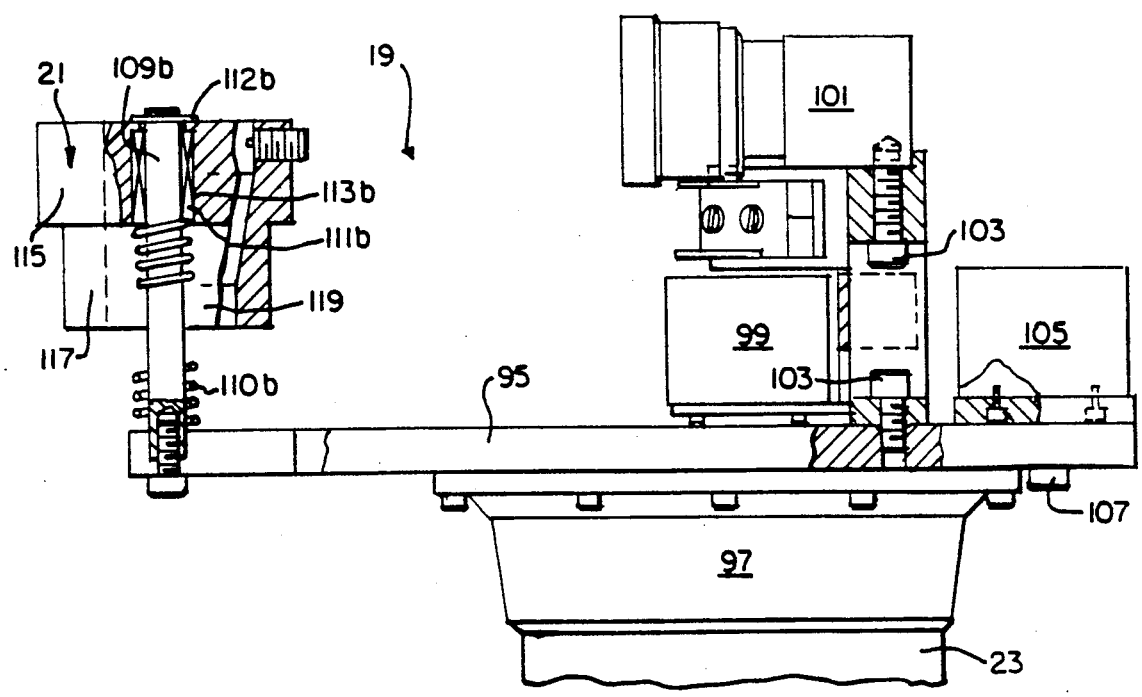
FIG. 2B is a side view of the end effector illustrated in FIG. 2A, showing a partial cross-sectional side view of the coupler.

Turning now to FIG. 2A, 2B and 3A, the end effector 19 of the system 1 comprises a support plate 94 having a robotic arm coupler 97 which projects from its bottom surface, and a probe camera bracket 99 which projects form its top surface. The arm coupler 97 receives a robotic arm 23 which, as previously indicated, is preferably the arm of a ROSA type robot. The probe camera bracket 99 mounts a probe television camera 101 by means of mounting screws 103. The probe camera 101 is positioned within the end effector 19 so that it is optically aligned with the window portion 78 of the probe guide assembly 17 when the coupler device 21 of the end effector 19 is in operation. A transformer 105 is mounted on the end of the support plate 95 opposite the coupler 21 by screws 107 for powering the camera 101.

The coupler 21 is resiliently mounted onto the support plate 95 by means of coupler guide rods 109a,b which are circumscribed by a pair of compression springs 110a,b. Linear bearings 111a,b slidably mount the coupler device 21 onto the guide rods 109a,b, while the compression springs 110a,b bias the coupler 21 to its upper most position with respect to the rods 109a,b into abutment against stop washers 112a,b. The linear bearings 111a,b are housed within recesses 113a,b disposed in opposition to one another within an enlarged shoulder 115 that circumscribes a coupling member. As has been indicated previously, the coupling member 117 includes a cup-shaped interior 119 which is complimentary in shape to the frustoconical coupling section 84 of the guide sleeve 64. The coupling member 117 further includes an opening 121 along its distal wall which is large enough to easily receive the neck 86 of the guide sleeve 64 without mechanical interference. The enlarged shoulder 115 terminates in tapered guide surfaces 122a,b which flank the edges of the opening 121 in order to guide the neck 86 of a guide sleeve 64 into the opening 121 during the coupling operation. Finally, the end effector 19 includes a tubesheet camera 123 which is also mounted onto the support plate 95 by means of tubesheet camera bracket 125. The purpose of the camera 123 is to allow the system operator to properly align the guide bushing 70 of a probe guide assembly 17 into a position against the underside of the tubesheet by means of a robotic arm 23 connected to the end effector 19.

The method of the invention may be carried out by the operation of the system 1, and is best understood with respect to FIGS. 1, 3A and 3B. In the first step of the operation of the system 1, the system operator extends one of the three probe guide assemblies 17 into the manway 54 of the steam generator, and then proceeds to couple the coupler 21 of the end effector 19 onto the guide sleeve 64 of the probe guide assembly 17. This is done by manipulating the robotic arm 23 so that the neck 86 is received within the opening 21 in the wall of the coupling member 117, and by subsequently manipulating the arm 23 upwardly so that the frustoconical coupling section 84 of the guide sleeve 64 is captured within the complimentarily-shaped interior 119 of the member 117. The system operator 1 then proceeds to move the probe guide assembly 17 into the position illustrated in FIG. 3A so that the guide bushing 70 located at the distal-most end of the guide sleeve 64 is placed into abutment against the underside of the tubesheet 7 with the open end 5 of a heat exchanger tube 3 being received within the open end 72 of the bushing 70. It should be noted that this step of the operation of the system 1 is greatly facilitated by the vertical compliance afforded by guide rods 109a,b and biasing springs 110a,b which resiliently mount the coupler 21 with respect to the support plate 95, as well as by the lateral compliance afforded by the guide bushing 70, whose inner diameter at its open end 72 is significantly larger than the outer diameter of the open end 5 of the tube 3 being treated. The inner diameter of this open end 72 is made large enough to afford the maximum amount of lateral compliance possible while still maintaining alignment between the distal end of the heater probe 15 and the open end 5 of the tube 3 during the insertion operation. During this probe guide assembly positioning step, the system operator 1 primarily utilizes the tubesheet camera 123 for visual guidance.

After the probe guide assembly 17 has been moved into the position illustrated in FIG. 3A by the end effector 19 of the robotic arm 23, the system operator actuates the pusher assembly 52 to slide one of the three heater probes 15 through the probe guide assembly 17 until the heater probe 15 is inserted into the open end 5 of the tube into the position illustrated in FIG. 3B. During this step, the system operator utilizes the probe television camera 101 which is optically aligned with the window portion 78 of the probe guide assembly 17. When the system operator sees that the mounting collar 44 of the heater probe 15 is in the position illustrated in FIG. 3B, he knows that the radiant heater assembly 28 is adjacent to the upper weld zone 13a to be heat treated. He then actuates the mounting mechanism 34 of the system 1 by introducing pressurized air through the circuit 50 and out the bore 41 in the reduced diameter portion 38 of the body portion 26 of the probe 15 in order to expand the bladder 36 into frictional engagement against the sleeve 9, thereby securely and temporarily mounting the probe 15 into the rube 3. As soon as this has been accomplished, the radiant heater assembly 28 of the probe 15 is actuated. Next, the system operator decouples the end effector 19 from the probe guide assembly 19 by merely lowering the robotic arm 23 so that the frustoconical coupling section 84 of the guide sleeve 64 is withdrawn from the complimentary interior 119 of the coupling member 117, and then pulling the end effector 19 away from the probe guide assembly 17 so that the neck 86 of the guide sleeve 64 is conducted out of the opening 121 in the walls of the coupling member 117. The end effector 19 is then free to position a second probe guide assembly 17 and a second heater probe 15 into the open end 5 of another heat exchanger tube 3 while the radiant heater assembly 28 of the first heater probe 15 proceeds to heat treat is respective tube. The aforementioned operation steps are then iterated with all three of the probe guide assembly 17 and heater probes 15 of the system 1. While it may be possible to utilize more than three probe guide assemblies 17 and heater probes 15, three such units are preferred due to the limited access space within the channel head of a typical nuclear steam generator, and the possible tangling problems which could result from the the use of a number of units greater than three.

What is claimed is:

1. A system for simultaneously heat treating a plurality of metallic tubes, each of which has an open end, comprising:

a plurality of heater probes receivable within the open ends of said tubes;

a plurality of probe guide assemblies positionable over the open ends of said tubes for guiding a heater probe into said tube, and an end effector means connected to a robotic arm having means for delivering said probe guide assemblies over the open ends of different tubes.

2. A system for simultaneously heat treating a plurality of metallic tubes as defined in claim 1, wherein each heater probe includes means for detachably securing said probe within a tube.

3. A system for simultaneously heat treating a plurality of metallic tubes as defined in claim 2, wherein each heater probe further includes means for supporting its respective probe guide assembly after said probe has been positioned a selected distance within said tube.

4. A system for simultaneously heat treating a plurality of metallic tubes as defined in claim 1, wherein said delivery means of said end effector means includes a coupler means for coupling and uncoupling from a probe guide assembly.

5. A system for simultaneously heat treating a plurality of metallic tubes as defined in claim 4, wherein each of said probe guide assemblies includes an enlarged diameter portion near one of its ends, and said coupler means forms an interference fit with said enlarged diameter portion of each of said probe guide assemblies when coupling thereto.

6. A system for simultaneously heat treating a plurality of metallic tubes as defined in claim 4, wherein each of said probe guide assemblies includes an enlarged diameter portion near one of its ends, and said coupler means includes a recess for receiving and capturing said enlarged diameter portion.

7. A system for simultaneously heat treating a plurality of metallic tubes as defined in claim 2, wherein said means for detachably securing said probe within a tube includes an expandable bladder means.

8. A system for simultaneously heat treating a plurality of metallic tubes as defined in claim 4, wherein said coupler means is resiliently mounted to the rest of the end effector means.

9. A system for simultaneously heat treating a plurality of metallic tubes as defined in claim 1, wherein each of said probe guide assemblies includes a window for allowing a system operator to observe whether or not a probe has been completely received within the open end of a tube.

10. A system for simultaneously heat treating a plurality of metallic tubes as defined in claim 3, wherein said supporting means includes an annular collar that forms an interference fit with a bushing mounted within said probe guide assembly.

11. A system for simultaneously heat treating a plurality of metallic tubes, each of which has an open end mounted in a tubesheet, comprising:

a plurality of heater probes receivable within the open ends of said tubes, each of which includes means for detachably securing said probe within a tube;

a plurality of probe guide assemblies, each of which includes a guide sleeve positionable over the open ends of said tubes against said tubesheet, and a guide conduit for guiding a heater probe through said guide sleeve and into a tube, and an end effector means connected to a robotic arm for delivering said guide assemblies over the open ends of different tubes, and having a coupler means for coupling to and uncoupling from a probe guide assembly.

12. A system for simultaneously heat treating a plurality of metallic tubes as defined in claim 11, wherein each of said probe guide assemblies includes an enlarged diameter portion near one of its ends, and said coupler means forms an interference fit with said enlarged diameter portion of each of said probe guide assemblies when coupling thereto.

13. A system for simultaneously heat treating a plurality of metallic tubes as defined in claim 12, wherein each of said probe guide assemblies includes an enlarged diameter portion near one of its ends, and said coupler means includes a cup-shaped recess for receiving and capturing said enlarged diameter portion.

14. A system for simultaneously heat treating a plurality of metallic tubes as defined in claim 11, wherein said means for detachably securing said probe within a tube includes an expandable bladder means.

15. A system for simultaneously heat treating a plurality of metallic tubes as defined in claim 11, wherein said coupler means is resiliently connected to the rest of the end effector means so that said coupler means is movably compliant with respect to said tubesheet when said coupler means is coupled to a probe guide sleeve and said robotic arm is used to position said guide sleeve over the open end of a tube and against said tubesheet.

16. A system for simultaneously heat treating a plurality of metallic tubes as defined in claim 15, wherein said end effector means includes means for informing a system operator when said coupler means has compliantly and resiliently moved with respect to said tubesheet.

17. A system for simultaneously heat treating a plurality of metallic tubes as defined in claim 16, wherein said informing means is a television camera.

18. A system for simultaneously heat treating a plurality of metallic tubes as defined in claim 11, wherein the guide sleeve of each of the probe guide assemblies includes a window for allowing a system operator to observe whether or not a probe has been completely inserted within a tube.

19. A system for simultaneously heat treating a plurality of metallic tubes as defined in claim 11, wherein each heater probe further includes means for supporting its respective probe guide assembly after said probe has been positioned a selected distance within said tube.

20. A system for simultaneously heat treating a plurality of metallic tubes as defined in claim 19, wherein said supporting means includes an annular collar that forms an interference fit with a bushing mounted within said probe guide assembly.

21. A system for simultaneously heat treating a plurality of heat exchanger tubes, each of which has an open end mounted in a tubesheet, comprising:

a plurality of heater probes receivable within the open ends of said tubes, each of which includes a means for detachably securing said probe within a tube;

a plurality of probe guide assemblies, each of which includes a guide sleeve positionable over the open ends of said tubes against said tubesheet, and a guide conduit for guiding a heater probe through said guide sleeve and into a tube, wherein the guide sleeve has an enlarged diameter portion relative to the rest of the guide sleeve, and an end effector means connected to a robotic arm for delivering said guide assemblies over the open ends of different tubes and including a coupling member having a recess capable of receiving and capturing the enlarged diameter portion of the guide sleeve, and an opening capable of conducting the non-enlarged diameter of the guide sleeve to the recess so that the coupling member forms an interference type fit with the guide sleeve when said recess of said coupling member is moved to receive said enlarged diameter portion of said guide sleeve after said non-enlarged portion has been conducted through said opening.

22. A system for simultaneously heat treating a plurality of heat exchanger tubes as defined in claim 21, wherein said means for detachably securing said probe within a tube includes an expandable bladder means.

23. A system for simultaneously heat treating a plurality of heat exchanger tubes as defined in claim 21, wherein each heater probe further includes means for supporting its respective probe guide assembly after said probe has been positioned a selected distance within said tube.

24. A system for simultaneously heat treating a plurality of heat exchanger tubes as defined in claim 23, wherein said supporting means includes an annular collar that forms an interference fit with a bushing mounted within said probe guide assembly.

25. A method for simultaneously heat treating a plurality of metallic tubes, each of which has an open end, by means of a plurality of heater probes and probe guide assemblies, each of which is capable of slidably conducting one of said heater probes, comprising:
  (a) positioning a first probe guide assembly into alignment with the open end of one of said tubes with a robotic arm that is detachably connected thereto;
  (b) slidably conducting a heater probe through said aligned probe guide assembly and into said open end of said tube;
  (c) detachably securing said heater probe within said tube and actuating said heater probe;
  (d) detaching said robotic arm form said first probe guide assembly and re-attaching it to a second probe guide assembly, and
  (e) repeating steps (a)-(d) with said second probe guide assembly and a second heater probe such that said first and second heater probes simultaneously apply heat to different tubes.

26. A method for simultaneously heat treating a plurality of metallic heat exchanger tubes, each of which has an open end mounted in a tubesheet, by means of a plurality of heater probes and probe guide assemblies, each of which is capable of slidably conducting one of said heater probes, comprising the steps of:
  positioning first and second probe guide assemblies into alignment with the open ends of first and second tubes;
  slidably conducting first and second heater probes through said first and second tubes via said first and second probe guide assemblies; and
  detachably securing said heater probes within their respective tubes, and
  simultaneously operating said heater probes to heat treat their respective tubes.

27. A method for a simultaneously heat treating a plurality of metallic heat exchanger tubes as defined in claim 26, wherein said first and second probe guide assemblies are sequentially positioned into alignment over their respective tubes by a robotic arm.

28. A method for simultaneously heat treating a plurality of metallic heat exchanger tubes as defined in claim 27, wherein said robotic arm includes an end effector having a coupling means that implements said positioning step by coupling to and uncoupling from said probe guide assemblies.

29. A method for simultaneously heat treating a plurality of metallic heat exchanger tubes as defined in claim 26, wherein each of said heater probes includes an inflatable bladder, and wherein each probe is detachably secured into its respective tube by inflating said bladder.

30. A method for simultaneously heat treating a plurality of metallic heat exchanger tubes as defined in claim 26, further including the step of remotely visually monitoring the alignment of said probe guide assemblies with their respective tubes.

* * * * *